United States Patent
Pierce

[15] 3,698,047
[45] Oct. 17, 1972

[54] CABLE CLAW ATTACHMENT

[72] Inventor: George W. Pierce, 340 West 29th Avenue, Eugene, Oreg. 97405

[22] Filed: Oct. 5, 1971

[21] Appl. No.: 186,727

[52] U.S. Cl. ...................24/238, 24/115, 24/126, 24/136, 294/83
[51] Int. Cl. ....A44b 13/00, F16g 11/00, B64d 17/38
[58] Field of Search.....24/238, 136, 194, 171, 230.5, 24/241 R, 241 CH, 241 SL, 243 AC, 249 WC, 263 C, 126 L, 126 C, 115 N, 115 R; 294/83 R, 82, 86 CG

[56] References Cited

UNITED STATES PATENTS 525,226  8/1894  Moffitt.....................24/115 R
3,078,536  2/1963  Bauer......................24/136 X Primary Examiner—Paul R. Gilliam
Attorney—Eckhoff, Hoppe, Slick, Mitchell & Anderson

[57] ABSTRACT

A cable claw attachment for tying down small aircraft is provided which is easily moved along the cable to a desired position by hand but wherein any upward or sideways movement of the aircraft will engage the claw and prevent movement along the cable. Tools are required to fasten the claw so that pilferage losses are reduced. An adapter provides for clamping on various sizes of cables.

2 Claims, 5 Drawing Figures

PATENTED OCT 17 1972 3,698,047

INVENTOR.
GEORGE W. PIERCE

CABLE CLAW ATTACHMENT

SUMMARY OF THE INVENTION

The present invention relates to a claw for connecting a chain or line to a steel cable or the like and is particularly adapted for tying down aircraft to a cable. The construction is such that one may grasp the claw by hand and, holding it at right angles to the cable easily slip it along the cable. However, should the aircraft be blown upward or to one side or the other, the claw will engage the cable, preventing movement of the claw along the cable.

One of the features of the present invention is that it is readily adaptable to two different sizes of cable. For instance, in the drawing there is shown a model which will fit either one-half or three-eights inch cable merely by the use of a small adapter.

Another feature of the present invention is that it is necessary to use tools to disengage the claw, thereby preventing most pilferage losses.

Other features of the invention will be brought out in the balance of the specification.

DESCRIPTION OF THE PREFERRED EMBODIMENT

Figure 5:
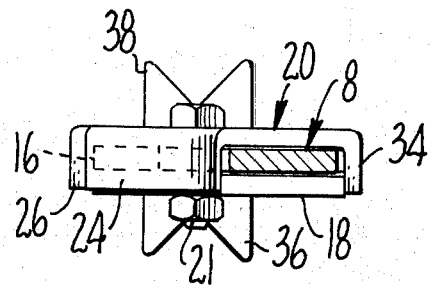
FIG. 5 is a section on the line 5—5 of FIG. 4.

Referring now to the drawings by reference characters, the cable claw includes a central shank portion generally designated 6, a top hook portion generally designated 8 and a bottom claw portion generally designated 10. The top hook portion 8 is adapted to be hooked onto a chain 12 and is preferably provided with a safety catch 14. The top hook portion forms no part of the present invention and will not be described in detail.

The bottom or claw portion 10 constitutes the crux of the present invention and includes a hook member 16 formed on the shank 6 with side plates 18 and 20 disposed on either side of the hook 16. Side plate 18 has an open jaw portion 22 while the mating side plate 20 has a similar open jaw portion but in addition has inwardly extending projections 24, 26, 28, 30, 32 and 34 which extend over the hook 16 and also over the edges of the side plate 18, forming a box-like structure which retains and surrounds the hook 16. The plates 18 and 20 are held together near their top portions by means of a nut and bolt 21, while a small prong 23 extending from the bottom of plate 18 fits into a mating slot in plate 30, holding the bottoms of the plates together. This allows limited movement of the hook 16 within the box-like structure so produced which can be best seen in FIG. 2; it is apparent that the hook can slip up and down within the box-like structure and that its movement will be limited by the end of the hook 16 designated 16A coming in contact with plate 24.

Figure 1:
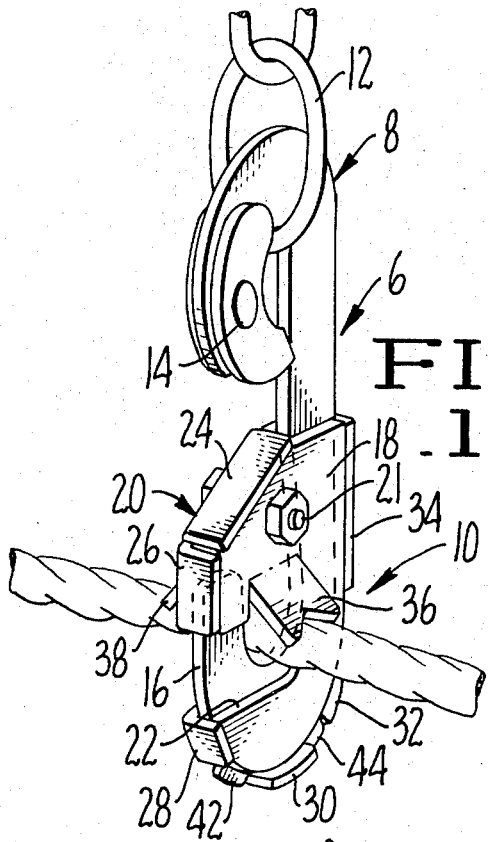
FIG. 1 is a perspective view of a cable claw embodying the present invention.

Each of the side plates 18 and 20 has a bifurcated prong extending outwardly at an angle of about 45° from the top of the jaw. Thus, the prong 36 extends from plate 18 while a similar prong 38 extends from the plate 20. Prongs 36 and 38 fit over the cable as is shown in FIG. 1 and if there is any movement upward on the chain 12, the hook 16 will move upwardly because of the limited movement permitted within the plates 18 and 20, previously described, bringing the prongs 36 and 38 into contact with the cable and preventing any sideways movement. Also, if there is any sideways movement of the chain 12, the claw will tilt and one or the other of the prongs will tend to engage the cable and prevent movement.

In order to initially place the claw on a cable it is necessary to disassemble the device by removing the nut and bolt combination 21. Since this ordinarily requires tools, pilferage is prevented.

Figure 4:
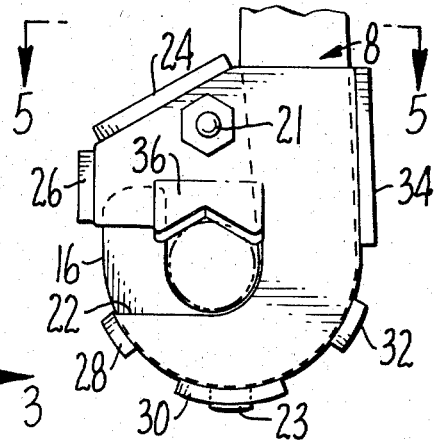
FIG. 4 is a partial side view of the claw, similar to FIG. 2 except that the adapter has been removed, showing the use of the claw on a larger size cable.
Figure 3:
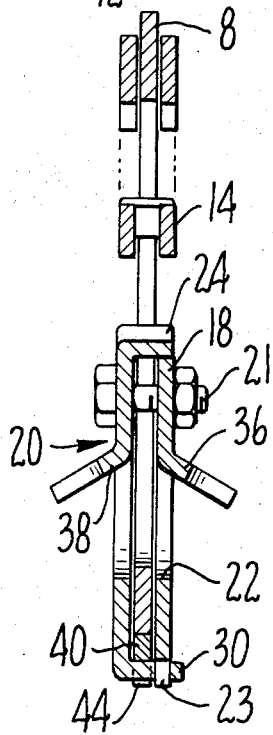
FIG. 3 is a section on the line 3—3 of FIG. 2.
Figure 2:
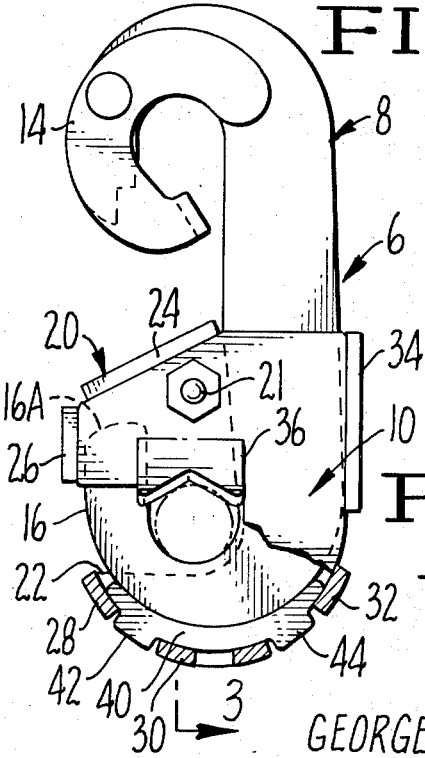
FIG. 2 is a side view of the cable claw shown in FIG. 1.

In a preferred embodiment of the invention, the device is made to accommodate two different sizes of cable. For instance, the model shown was designed to use on either a one-half or three-eights inch cable. In order to accomplish this, a small adapter 40 is provided having a central arcuate section and the small projections 42 and 44 which extend between the members 28 and 30 and between 30 and 32. As can be seen in FIG. 2, with the adapter in place, a relatively small cable can be employed, while with the adapter removed, as is shown in FIG. 4, a relatively large cable is accommodated.

I claim:

1. A cable claw comprising in combination:
   a. a hook,
   b. first and second side plates mounted on each side of said hook,
   c. said side plates normally closing said hook,
   d. said side plates confining said hook but allowing limited movement of the hook whereby the hook can move up and down within the side plates,
   e. a bifurcated prong extending from near the top of each side plate outwardly and downwardly at an angle of about 45°,
   f. whereby a cable can pass through said hook and will be retained by said side plates and whereby upward movement of said hook within said side plates will cause said bifurcated prongs to engage said cable and prevent sideways movement of the claw along said cable.

2. The structure of claim 1 wherein an adapter is provided at the base of said hook whereby said adapter can be placed within the hook for a relatively small cable and removed from said hook to accommodate a relatively large cable.

* * * * *